3,397,216
COORDINATION COMPLEXES OF METAL HALIDES AND PENTAVALENT PHOSPHORUS COMPOUNDS

Frank J. Welch, Charleston, and Herbert J. Paxton, Jr., Elkview, W. Va., assignors to Union Carbide Corporation, a corporation of New York
No Drawing. Filed Oct. 30, 1963, Ser. No. 319,959
28 Claims. (Cl. 260—429.5)

This invention relates to coordination complexes of halides of antimony, tin and titanium with pentavalent phosphorus compounds, and to the use of these complexes as fire retardants for polymer systems.

Compounds of antimony, tin and titanium, as well as compounds of phosphorus, are valuable flame retardants for various polymer systems. However, the usefulness of these antimony, tin and titanium compounds is somewhat limited by their insolubility in organic media, as this makes them difficult to incorporate into polymer systems, lowers their effectiveness, and precludes their use in transparent resins.

In accordance with the instant invention, a method has been found for solubilizing antimony, tin and titanium halides and rendering them compatible with various polymer systems. Thus, it has been found that these compounds can be complexed with various pentavalent phosphorus compounds, which are themselves effective fire retardants, to produce coordination complexes which are highly soluble in and compatible with a wide variety of organic liquids and polymers.

While any halide of antimony, tin, or titanium can be employed in the instant invention, the chlorides and bromides are preferred because of their greater solubility. Included among the halides which can be employed are antimony tribromide, antimony trichloride, antimony pentachloride, antimony trifluoride, antimony pentafluoride, antimony triiodide, antimony pentaiodide, stannous bromide, stannic bromide, stannic tribromide chloride, stannic dibromide dichloride, stannic bromide trichloride, stannic dibromide diiodide, stannous chloride, stannic chloride, stannic dichloride diiodide, stannous fluoride, stannic fluoride, stannous iodide, stannic iodide, titanium dibromide, titanium tetrabromide, titanium dichloride, titanium trichloride, titanium tetrachloride, titanium trifluoride, titanium tetrafluoride, titanium diiodide, titanium tetraiodide, and the like.

The pentavalent phosphorus compounds which are employed in the instant invention can be represented by the formulas:

$$R_n\overset{O}{\overset{\|}{P}}X_{(3-n)} \text{ and } Y_2\overset{O}{\overset{\|}{P}}-(CH_2)_m(O)_p-\overset{O}{\overset{\|}{P}}Y_2$$

wherein R is a monovalent hydrocarbon radical, including aliphatic, alicyclic and aromatic, and substituted aliphatic, alicyclic and aromatic, having from 1 to 20 carbon atoms, preferably from 1 to 12 carbon atoms; X is a halogen, such as fluorine, chlorine, bromine, or iodine, or —OR or —NR$_2$, where R is as above defined; Y is —R or —OR where R is as above defined; n is an integer having a value of from 0 to 2; m is an integer having a value of from 0 to 10, preferably from 0 to 4, and is at least 1 when p is 0; and p is an integer having a value of 0 or 1, and is 1 when m is 0. Illustrative of R in the above formula are radicals such as methyl, ethyl, vinyl, allyl, n-propyl, isopropyl, n-butyl, n-pentyl, n-hexyl, cyclohexyl, cyclohexenyl, 4-methypentyl, n-heptyl, n-octyl, 2-ethylhexyl, n-nonyl, n-decyl, 2,2-dimethyldecyl, n-tridecyl, n-tetradecyl, n-pentadecyl, n-octadecyl, n-eicosyl, phenyl, cresyl, tolyl, xylyl, naphthyl, and the like. Optionally such radicals can be substituted with various substituents, such as ether, ester, hydroxyl, sulfide, halogen, amino, and the like.

Among the phosphorus compounds which can be employed in the instant invention are phosphates such as triethyl phosphate (EtO)$_3$PO, tricresyl phosphate,

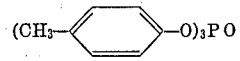

triallyl phosphate (CH$_2$=CH—CH$_2$O)$_3$PO, tris(2-ethylhexyl) phosphate, $$(CH_3CH_2CH_2CH_2\overset{C_2H_5}{\underset{|}{C}H}CH_2O)_3PO$$

tris(2-chloroethyl) phosphate, (ClCH$_2$CH$_2$O)$_3$PO, tris(2,3-dibromopropyl) phosphate, $$(BrCH_2BrCHCH_2O)_3PO$$

tris(2,3-dichloropropyl) phosphate, $$(ClCH_2ClCHCH_2O)_3PO$$

dimethylvinyl phosphate, $$CH_2=CHO\overset{O}{\overset{\|}{P}}(OCH_3)_2$$

and the like; phosphonates such as bis(2-chloroethyl) 2-chloroethylphosphonate, $$ClCH_2CH_2\overset{O}{\overset{\|}{P}}(OCH_2CH_2Cl)_2, \text{ bis(2-chloroethyl)vinylphosphonate}$$

$$(ClCH_2CH_2CH_2O)_2\overset{O}{\overset{\|}{P}}CH=CH_2 \text{ dibutyl vinylphosphonate}$$

$$CH_2=CH-\overset{O}{\overset{\|}{P}}(OCH_2CH_2CH_2CH_3)_2, \text{ diphenyl ethylphosphonate}$$

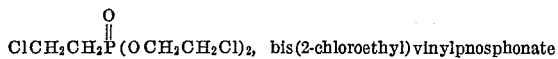 bis(2,3-dibromopropyl)ethylphosphonate $$(BrCH_2BrCHCH_2O)_2\overset{O}{\overset{\|}{P}}C_2H_5$$

and the like, diphosphonates such as tetraethyl ethylenediphosphonate, $$(C_2H_5O)_2\overset{O}{\overset{\|}{P}}CH_2CH_2\overset{O}{\overset{\|}{P}}(OC_2H_5)_2$$

and the like; phosphinates such as ethyl diphenylphosphinate.

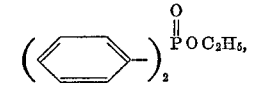

2-chloroethyl phenyl-2-chloroethylphosphinate,

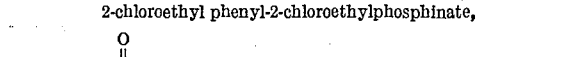
2-chlorethyl vinyl-n-butylphosphinate

$$ClCH_2CH_2O\overset{O}{\overset{\|}{P}}-CH_2CH_2CH_2CH_3\\\underset{|}{\underset{CH=CH_2}{}}$$

and the like; phosphoramides such as hexamethylphosphoramide, [(CH$_3$)$_2$N]$_3$PO, and the like; and phosphonyl chlorides such as phenylphosphonyl dichloride,

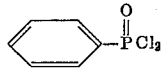

and the like.

The coordination complexes of the instant invention are prepared by mixing the metal halide and the pentavalent phosphorus compound in a ratio of from about 0.25 mole to about 10 moles, preferably from about 0.5 mole to about 3 moles, of the metal halide per mole of the phosphorus compound, and mildly heating the mixture if necessary. Temperatures of 50° C. or less are usually adequate, although temperatures of from less than 0° C. to greater than 100° C. can be employed. The metal halide first forms a coordination complex with the phosphorus compound, with any metal halide over and above that required to form the complex then dissolving in the complex to produce viscous liquid or low melting solids. In the case of difficulty soluble metal halides, such as the metal iodides, complexing of the metal halide with the phosphorus compound may be facilitated by first dissolving the metal halide and the phosphorus compound in a suitable inert polar organic solvent and then evaporating the solvent. Suitable solvents include alcohols such as ethanol, butanol isopropanol and the like, ethers such as ethyl ether, tetrahydrofuran, and the like, esters such as ethyl acetate, and the like, aromatic hydrocarbons such as benzene, toluene, and the like, and alkyl halides such as ethylene dichloride, and the like. In general, an amount of solvent ranging from about 1 to about 100 times, preferably from about 5 to about 20 times, the weight of the reactants, can be effectively employed.

The complexes prepared in accordance with the instant invention are soluble in a wide variety of organic media, including organic liquids, monomers, and polymers. Among the organic liquids in which these complexes are readily soluble are poly(propylene glycol), ethanol, butanol, isopropanol, ethyl ether, tetrahydrofuran, ethyl acetate, benzene, toluene, ethylene dichloride, and the like. These complexes can also be dissolved in various polymerizable monomers, such as styrene, methyl, methacrylate, vinyl acetate, ethyl acrylate, and the like. When they are dissolved in polymeric systems, they function as flame retardants for such systems. Among the polymeric systems in which the fire retarding complexes of the instant invention can be readily dissolved and blended are epoxy, phenolic, polyurethane, polyester, and polystyrene resins. These complexes can be readily dissolved in such resins by milling on a two-roll mill. Amounts of complex of from about 1 part by weight to about 40 parts by weight, or higher, preferably from about 10 parts by weight to about 25 parts by weight, based on the total weight of the blend, are suitable and more effective than an equal weight of the phosphorus compound alone.

Fire retardant resins can also be prepared by dissolving the complexes of the instant invention in a polymerizable monomer, such as styrene, methyl methacrylate, vinyl acetate, ethyl acrylate, and the like, and then polymerizing the monomer. The amounts of complex to be employed are the same as those employed when the complex is directly incorporated in polymeric systems.

When the complexes of the instant invention are prepared from phosphorus compounds which contain an unsaturated group, they can be incorporated into polymeric structures by interpolymerizing such complexes with other polymerizable monomers. Interpolymerization can be effected by means of a suitable vinyl polymerization catalyst, such as an anionic catalyst or a catalyst capable of forming free radicals under the polymerization conditions employed. Generally, temperatures of from about —25° C. to about 200° C. are suitable. Known solvents can be employed in the polymerization mixture if desired. Typical of the anionic catalysts which can be employed are Grignard reagents and other metal alkyls such as n-butylmagnesium chloride, di-n-butylmagnesium, ethyllithium, phenyllithium, triethylaluminum, methylmagnesium bromide, and phenylmagnesium iodide, and the like. Among the free radical catalysts which can be employed are oxygen, either alone or together with a trialkylboron, such as trimethylboron, triethylboron and tripropylboron; peroxides such as hydrogen peroxide, diethyl peroxide, dibenzoyl peroxide, distearyl peroxide, ditertiary-butyl peroxide, tertiary-butyl hydroperoxide, diacetyl peroxide, distearoyl peroxide and acetyl benzoyl peroxide; azo compounds such as $\alpha,\alpha'$-azo-bis-isobutyronitrile and 2,2'-dicyanoazobenzene; percarbonates such as diisopropyl percarbonate and di-tertiary-butyl percarbonate; and peresters such as tertiary-butyl-perbenzoate and acetaldehyde monoperacetate. These catalysts are employed in amounts which are conventionally employed in the art, either individually or in various mixtures thereof. Thus such catalysts can be employed in an amount of from about 0.2 percent by weight to about 10 percent by weight, preferably from about 0.5 percent by weight to about 3 percent by weight, of the total amount of monomers present.

The following examples are set forth for purposes of illustration so that those skilled in the art may better understand this invention, and it should be understood that they are not to be construed as limiting this invention in any manner.

Example 1

A coordination complex of antimony trichloride and tris(2,3-dibromoprophyl) phosphate was prepared by dissolving eighty (80) grams (0.35 mole) of antimony trichloride in 558 grams (0.80 mole) of tris(2,3-dibromopropyl) phosphate at 50° C. The liquid product was miscible with poly(propylene glycol), ethanol, styrene, methyl methacrylate and vinyl acetate.

The liquid product had a viscosity of 100,000 centipoises at 0° C., as measured on a Brookfield viscometer using a No. 4 spindle at 12 r.p.m. At 25° C. using a No. 3 spindle at 60 r.p.m., the viscosity was 1,466 centipoises, and at 50° C. the viscosity was 1,120 centipoises using a No. 3 spindle at 60 r.p.m.

When the liquid product was heated at 150° C. no discoloration appeared until after 45 minutes of heating. At 180° C., discoloration began after 4 or 5 minutes of heating.

The liquid product was characterized by an infrared spectrum of the phosphoryl band of 8.1$\mu$, as compared to 7.85$\mu$ in tris(2,3-dibromopropyl) phosphate.

Example 2

A coordination complex of antimony trichloride and tris(2,3-dibromopropyl) phosphate was prepared by dissolving 46 grams (0.20 mole) of antimony trichloride in 140 grams (0.20 mole) of tris(2,3-dibromopropyl) phosphate at 50° C.

The liquid product had a voscosity of 100,000 centipoises at 0° C., as measured on a Brookfield viscometer using a No. 4 spindle at 6 r.p.m. At 25° C. using a No. 4 spindle at 60 r.p.m. the viscosity was 6,400 centipoises, and at 50° C. the viscosity was 430 centipoises using a No. 3 spindle at 60 r.p.m.

When the liquid product was heated at 150° C. no discoloration appeared until atfer 25 minutes of heating. At 180° C., discoloration began after 5 minutes of heating.

The liquid product was characterized by an infrared spectrum of the phosphoryl band of 8.15$\mu$ as compared to 7.85$\mu$ in tris(2,3-dibromopropyl) phosphate.

Example 3

A coordination complex of antimony trichloride and tris(2,3-dibromopropyl) phosphate was prepared by dissolving 91 grams (0.40 mole) of antimony trichloride in 140 grams (0.20 mole) of tris(2,3-dibromopropyl) phosphate at 50° C.

The liquid product had a viscosity of 100,000 centipoises at 0° C., as measured on a Brookfield viscometer using a No. 3 spindle at 6 r.p.m. At 25° C. using a No. 3 spindle at 60 r.p.m. the viscosity was 1,640 centipoises, and at 50° C. the viscosity was 200 centipoises using a No. 3 spindle at 60 r.p.m.

When the liquid product was heated at 150° C. discoloration appeared after 2 minutes of heating.

The liquid product was characterized by an infrared spectrum of the phosphoryl band of 8.1μ as compared to 7.85μ in tris(2,3-dibromopropyl) phosphate.

Example 4

A coordination complex of antimony trichloride and trioctyl phosphate was prepared by dissolving 24 grams (0.1 mole) of antimony trichloride in 174 grams (0.4 mole) of trioctyl phosphate at 50° C.

The liquid product had a viscosity of 112 centipoises at 0° C., as measured on a Brookfield viscometer using a No. 2 spindle at 60 r.p.m. At 25° C. using a No. 2 spindle at 60 r.p.m. the viscosity was 52 centipoises, and at 50° C. the viscosity was 24 centipoises using a No. 2 spindle at 60 r.p.m.

When the liquid product was heated at 150° C. no discoloration appeared until after 85 minutes of heating. At 180° C., discoloration began after 26 minutes of heating.

The liquid product was characterized by an infrared spectrum of the phosphoryl band of 8.2μ as compared to 7.77μ in trioctyl phosphate.

Example 5

A coordination complex of antimony trichloride and trioctyl phosphate was prepared by dissolving 24 grams (0.1 mole) of antimony trichloride in 87 grams (0.2 mole) of trioctyl phosphate at 50° C.

The liquid product had a viscosity of 280 centipoises at 0° C., as measured on a Brookfield viscometer using a No. 2 spindle at 60 r.p.m. At 25° C. using a No. 2 spindle at 60 r.p.m. the viscosity was 85 centipoises, and at 50° C. the viscosity was 35 centipoises using a No. 2 spindle at 60 r.p.m.

When the liquid product was heated at 150° C. no discoloration appeared until after 30 minutes of heating. At 180° C., discoloration began after 20 minutes of heating.

The liquid product was characterized by an infrared spectrum of the phosphoryl band of 8.2μ as compared to 7.77μ in trioctyl phosphate.

Example 6

A coordination complex of antimony trichloride and tris(2-chloroethyl) phosphate was prepared by dissolving 57 grams (0.25 mole) of antimony trichloride in 144 grams (0.50 mole) of tris(2-chloroethyl) phosphate at 50° C.

The liquid product had a viscosity of 616 centipoises at 0° C., as measured on a Brookfield viscometer using a No. 2 spindle at 30 r.p.m. At 25° C. using a No. 2 spindle at 60 r.p.m. the viscosity was 165 centipoises, and at 50° C. the viscosity was 65 centipoises using a No. 2 spindle at 60 r.p.m.

When the liquid product was heated at 150° C. no discoloration appeared until after 135 minutes of heating. At 180° C., discoloration began after 27 minutes of heating.

The liquid product was characterized by an infrared spectrum of the phosphoryl band of 8.3μ as compared to 7.8μ in tris(2-chloroethyl) phosphate.

Example 7

A coordination complex of antimony trichloride and tricresyl phosphate was prepared by dissolving 30 grams (0.13 mole) of antimony trichloride in 184 grams (0.5 mole) of tricresyl phosphate at 50° C.

The liquid product had a viscosity of 1,860 centipoises at 0° C., as measured on a Brookfield viscometer using a No. 3 spindle at 60 r.p.m. At 25° C. using a No. 2 spindle at 60 r.p.m. the viscosity was 398 centipoises, and at 50° C. the viscosity was 80 centipoises using a No. 2 spindle at 60 r.p.m.

When the liquid product was heated at 150° C. no discoloration appeared until after 240 minutes of heating.

At 180° C., discoloration began after 75 minutes of heating.

The liquid product was characterized by an infrared spectrum of the phosphoryl band of 8.05μ as compared to 7.6μ in tricresyl phosphate.

Example 8

A coordination complex of antimony trichloride and tricresyl phosphate was prepared by dissolving 46 grams (0.20 mole) of antimony trichloride in 37 grams (0.10 mole) of tricresyl phosphate at 50° C.

The liquid product had a viscosity of 4,800 centipoises at 0° C., as measured on a Brookfield viscometer using a No. 3 spindle at 12 r.p.m. At 25° C. using a No. 2 spindle at 30 r.p.m. the viscosity was 500 centipoises, and at 50° C. the viscosity was 87 centipoises using a No. 2 spindle at 60 r.p.m.

When the liquid product was heated at 150° C. no discoloration appeared until after 120 minutes of heating. At 180° C., discoloration began after 60 minutes of heating.

The liquid product was characterized by an infrared spectrum of the phosphoryl band of 8.05μ as compared to 7.6μ in tricresyl phosphate.

Example 9

A coordination complex of antimony trichloride and tris(2,3-dichloropropyl) prosphate was prepared by dissolving 24 grams (0.1 mole) of antimony trichloride in 173 grams (0.4 mole) of tris(2,3-dichloropropyl) phosphate at 50° C.

The liquid product had a viscosity of 100,000 centipoises at 0° C., as measured on a Brookfield viscometer using a No. 4 spindle at 12 r.p.m. At 25° C. using a No. 4 spindle at 60 r.p.m. the viscosity was 26,800 centipoises, and at 50° C. the viscosity was 530 centipoises using a No. 4 spindle at 60 r.p.m.

When the liquid product was heated at 150° C. no discoloration appeared until after 15 minutes of heating. At 180° C., discoloration began after 7 minutes of heating.

The liquid product was characterized by an infrared spectrum of the phosphoryl band of 8.1μ as compared to 7.8μ in tris(2,3-dichloropropyl) phosphate.

Example 10

A coordination complex of antimony trichloride and triethyl phosphate was prepared by dissolving 4.6 grams (0.02 mole) of antimony trichloride in 7.3 grams (0.04 mole) of triethyl phosphate at 50° C.

The liquid product had a viscosity of 19 centipoises at 0° C., as measured on a Brookfield viscometer using a No. 2 spindle at 60 r.p.m. At 25° C. using a No. 2 spindle at 60 r.p.m. the viscosity was 12 centipoises, and at 50° C. the viscosity was 9 centipoises using a No. 2 spindle at 60 r.p.m.

When the liquid product was heated at 150° C. no discoloration appeared until after 30 minutes of heating. At 180° C., discoloration began after 8 minutes of heating.

The liquid product was characterized by an infrared spectrum of the phosphoryl band of 8.2μ as compared to 7.83μ in triethyl phosphate.

Example 11

A coordination complex of antimony trichloride and triallyl phosphate was prepared by dissolving 114 grams (0.5 mole) of antimony trichloride in 218 grams (1.0 mole) of triallyl phosphate at 50° C.

The liquid product had a viscosity of 35 centipoises at 0° C., as measured on a Brookfield viscometer using a No. 2 spindle at 60 r.p.m. At 25° C. using a No. 2 spindle at 60 r.p.m. the viscosity was 18 centipoises, and at 50° C. the viscosity was 12 centipoises using a No. 2 spindle at 60 r.p.m.

When the liquid product was heated at 150° C. no discoloration appeared until after 25 minutes of heating.

The liquid product was characterized by an infrared spectrum of the phosphoryl band of 8.2µ as compared to 7.8µ in triallyl phosphate.

Example 12

A coordination complex of antimony trichloride and bis(2-chloroethyl) 2-chloroethylphosphonate was prepared by dissolving 57 grams (0.25 mole) of antimony trichloride in 135 grams (0.5 mole) of bis(2-chloroethyl) 2-chloroethylphosphonate at 50° C.

The liquid product had a viscosity of 5,300 centipoises at 0° C., as measured on a Brookfield viscometer using a No. 4 spindle at 60 r.p.m. At 25° C. using a No. 3 spindle at 60 r.p.m. the viscosity was 720 centipoises, and at 50° C. the viscosity was 80 centipoises using a No. 3 spindle at 60 r.p.m.

When the liquid product was heated at 150° C. no discoloration appeared until after 360 minutes of heating. At 200° C., discoloration began after 90 minutes of heating.

The liquid product was characterized by an infrared spectrum of the phosphoryl band of 8.35µ as compared to 7.95µ in bis(2-chloroethyl) 2-chloroethylphosphonate.

Example 13

A coordination complex of antimony trichloride and bis(2-chloroethyl) 2-chloroethylphosphonate was prepared by dissolving 54 grams (0.238 mole) of antimony trichloride in 43 grams (0.16 mole) of bis(2-chloroethyl) 2-chloroethylphosphonate at 50° C.

The liquid product had a viscosity of 6,000 centipoises at 0° C., as measured on a Brookfield viscometer using a No. 3 spindle at 12 r.p.m. At 25° C. using a No. 3 spindle at 60 r.p.m. the viscosity was 868 centipoises, and at 50° C. the viscosity was 232 centipoises using a No. 3 spindle at 60 r.p.m.

When the liquid product was heated at 150° C. no discoloration appeared until after 55 minutes of heating. At 180 C., discoloration began after 24 minutes of heating.

The liquid product was characterized by an infrared spectrum of the phosphoryl band of 8.5µ as compared to 7.95µ in bis(2-chloroethyl) 2-chloroethylphosphonate.

Example 14

A coordination complex of antimony trichloride and diethyl vinylphosphonate was prepared by dissolving 34 grams (0.15 mole) of antimony trichloride in 49 grams (0.30 mole) of diethyl vinylphosphonate at 50° C.

The liquid product had a viscosity of 64 centipoises at 0° C., as measured on a Brookfield viscometer using a No. 2 spindle at 60 r.p.m. At 25° C. using a No. 2 spindle at 60 r.p.m. the viscosity was 36 centipoises, and at 50° C. the viscosity was 14 centipoises using a No. 2 spindle at 60 r.p.m.

When the liquid product was heated at 150° C. no discoloration appeared until after 60 minutes of heating.

The liquid product was characterized by an infrared spectrum of the phosphoryl band of 8.4µ as compared to 8.0µ in diethyl vinylphosphonate.

Example 15

A coordination complex of antimony trichloride and tetraethyl ethylenediphosphonate was prepared by dissolving 9.1 grams (0.04 mole) of antimony trichloride in 12.1 grams (0.04 mole) of tetraethyl ethylenediphosphonate at 50° C.

When the liquid product was heated at 150° C. no discoloration appeared until after 20 minutes of heating. At 200° C., discoloration began after 3 minutes of heating.

The liquid product was characterized by a broad band of 8.15µ to 8.55µ in the infrared spectrum of the phosphoryl band as compared to an intense peak of 8.0µ and two smaller peaks of 8.4µ and 8.6µ in tetraethyl ethylenediphosphonate.

Example 16

A coordination complex of antimony trichloride and ethyl diphenylphosphinate was prepared by dissolving 11.4 grams (0.05 mole) of antimony trichloride in 23 grams (0.10 mole) of ethyl diphenylphosphinate at 50° C. A very viscous liquid product was obtained.

When the liquid product was heated at 150° C. no discoloration appeared after several hours of heating. At 180° C., discoloration began after one hour of heating.

The liquid product was characterized by an infrared spectrum of the phosphoryl band of 8.50µ as compared to 8.15µ in ethyl diphenylphosphinate.

Example 17

A coordination complex of antimony trichloride and hexamethylphosphoramide was prepared by dissolving 114 grams (0.5 mole) of antimony trichloride in 179 grams (1.0 mole) of hexamethylphosphoramide at room temperature under an atmosphere of nitrogen. As the antimony trichloride dissolved, the temperature of the mixture rose to 80° C. On cooling to room temperature, the product solidified.

When the product was heated at 150° C. no discoloration appeared after two hours of heating.

The product was characterized by an infrared spectrum of the phosphoryl band of 8.40µ as compared to 8.25µ in hexamethylphosphoramide, and by the formation of a new band at 8.9µ.

Example 18

A coordination complex of antimony trichloride and hexamethylphosphoramide was prepared by dissolving 57 grams (0.25 mole) of antimony trichloride in 146 grams (0.25 mole) of hexamethylphosphoramide at room temperature under an atmosphere of nitrogen. As the antimony trichloride dissolved, the temperature of the mixture rose to 80° C. On cooling to room temperature, the product solidified.

The properties of this 1:1 mole ratio product were similar to the 1:2 mole ratio product of Example 17.

Example 19

A coordination complex of antimony trichloride and phenylphosphonyl dichloride was prepared by dissolving 4.6 grams (0.02 mole) of antimony trichloride in 7.8 grams (0.04 mole) of phenylphosphonyl dichloride at 25° C.

The liquid product was characterized by an infrared spectrum of the phosphoryl band of 7.95µ as compared to 7.75µ in phenylphosphonyl dichloride.

Example 20

A coordination complex of antimony tribromide and tris(2-ethylhexyl) phosphate was prepared by dissolving 18 grams (0.05 mole) of antimony tribromide in 44 grams (0.10 mole) of tris(2-ethylhexyl) phosphate at 60° C. The liquid product was miscible with vinyl acetate, styrene, methyl methacrylate and poly(propylene glycol.)

The liquid product had a viscosity of 294 centipoises at 0° C., as measured on a Brookfield viscometer using a No. 3 spindle at 60 r.p.m. At 25° C. using a No. 3 spindle at 60 r.p.m. the viscosity was 66 centipoises, and at 50° C. the viscosity was 26 centipoises using a No. 3 spindle at 60 r.p.m.

When the liquid product was heated at 140° C. no discoloration appeared after 180 minutes of heating. At 170° C., discoloration began after a few minutes of heating.

The liquid product was characterized by an infrared spectrum of the phosphoryl band of 8.3µ as compared to 7.8µ in tris(2-ethylhexyl) phosphate.

Example 21

A coordination complex of stannic chloride and tris(2-chloroethyl) phosphate was prepared by dissolving 52 grams (0.20 mole) of stannic chloride in 115 grams (0.40 mole) of tris(2-chloroethyl) phosphate at 50° C.

The liquid product had a viscosity of 18,000 centipoises at 0° C., as measured on a Brookfield viscometer using a No. 4 spindle at 30 r.p.m. At 25° C. using a No. 3 spindle at 30 r.p.m. the viscosity was 3,136 centipoises, and at 50° C. the viscosity was 480 centipoises using a No. 3 spindle at 60 r.p.m.

When the liquid product was heated at 150° C. no discoloration appeared until after 45 minutes of heating. At 180° C., discoloration began after 20 minutes of heating.

The liquid product was characterized by an infrared spectrum of the phosphoryl band of $8.6\mu$ as compared to $7.8\mu$ in tris(2-chloroethyl) phosphate.

Example 22

A coordination complex of stannic chloride and trioctyl phosphate was prepared by dissolving 52 grams (0.20 mole) of stannic chloride in 174 grams (0.40 mole) of trioctyl phosphate at 50° C.

The liquid product had a viscosity of 520 centipoises at 0° C., as measured on a Brookfield viscometer using a No. 2 spindle at 60 r.p.m. At 25° C. using a No. 2 spindle at 60 r.p.m. the viscosity was 250 centipoises and at 50° C. the viscosity was 81 centipoises using a No. 2 spindle at 60 r.p.m.

When the liquid product was heated at 150° C. no discoloration appeared until after 50 minutes of heating. At 180° C., discoloration began after 20 minutes of heating.

The liquid product was characterized by an infrared spectrum of the phosphoryl band of $8.45\mu$ as compared to $7.8\mu$ in trioctyl phosphate.

Example 23

A coordination complex of titanium tetrachloride and bis(2 - chloroethyl) 2-chloroethylphosphonate was prepared by dissolving 47 grams (0.25 mole) of titanium tetrachloride in 135 grams (0.50 mole) of bis(2-chloroethyl) 2-chloroethylphosphonate at 50° C.

The liquid product had a viscosity of 100,000 centipoises at 0° C., as measured on a Brookfield viscometer using a No. 4 spindle at 30 r.p.m. At 25° C. using a No. 4 spindle at 30 r.p.m. the viscosity was 25,000 centipoises, and at 50° C. the viscosity was 2,300 centipoises using a No. 3 spindle at 30 r.p.m.

When the liquid product was heated at 150° C. no discoloration appeared until after 25 minutes of heating.

The liquid product was characterized by an infrared spectrum of the phosphoryl band of $8.45\mu$ as compared to $8.0\mu$ in bis(2-chloroethyl) 2-chloroethylphosphonate.

Example 24

A coordination complex of antimony triiodide and trioctyl phosphate was prepared by admixing 25 grams (0.05 mole) of antimony triiodide, 43.5 grams (0.10 mole) of trioctyl phosphate, and 200 milliliters of ethanol, and heating the mixture at its refluxing temperature for four hours. At the end of time a quantity of antimony triiodide which did not dissolve was removed by filtration. Ethanol was then removed from the mixture by evaporation under reduced pressure.

The non-viscous liquid product (61 grams) showed two infrared phosphoryl absorption bands, one at $7.8\mu$, which corresponds to the uncomplexed phosphate, and a less intense band that has shifted to $8.25\mu$.

Example 25

A coordination complex of antimony pentachloride and bis(2 - chloroethyl) 2 - chloroethylphosphonate was prepared by dissolving 30 grams (0.10 mole) of antimony pentachloride in 54 grams (0.20 mole) of bis(2-chloroethyl) 2-chloroethylphosphonate at room temperature. As the salt dissolved, a considerable amount of heat was evolved.

The liquid product had a viscosity of 9,600 centipoises at 0° C., as measured on a Brookfield viscometer using a No. 4 spindle at 30 r.p.m. At 25° C. using a No. 3 spindle at 60 r.p.m. the viscosity was 920 centipoises, and at 50° C. the viscosity was 150 centipoises using a No. 2 spindle at 150 r.p.m.

When the liquid product was heated at 160° C. no discoloration appeared until after 240 minutes of heating. At 200° C. no discoloration appeared until after 120 minutes of heating.

An infrared spectrum of the liquid product showed the magnitude of the phosphoryl group absorption band at $8.1\mu$ had decreased and the formation of a new band of equal intensity at $8.43\mu$, indicating that some coordination complexing had occurred.

When a similar product was prepared using equal molar amounts of the two components, the infrared spectrum of the product showed a weak phosphoryl group at $8.05\mu$, a somewhat more intense band of $8.25\mu$, and a strong band at $8.45\mu$.

Example 26

Three (3) grams of polystyrene and 1.0 gram of antimony trichloride in tris(2,3-dibromopropyl) phosphate (prepared in accordance with Example 1) were stirred together and then placed in a 2½" mold and heated at 150° C. for 10 minutes in a Carver lab press under a pressure of 5000 p.s.i. After cooling to room temperature a transparent, hard plaque was obtained which would not burn.

Example 27

Three (3) grams of poly(methyl methacrylate) and 1.0 gram of antimony trichloride in bis(2-chloroethyl) 2-chloroethylphosphonate (prepared in accordance with Example 12) were stirred together and then placed in a 2½" mold and heated at 150° C. for 10 minutes in a Carver lab press under a pressure of 5,000 p.s.i. After cooling to room temperature a transparent, hard, self-extinguishing plaque was obtained.

Example 28

Three (3) grams of poly(methyl methacrylate) and 1 gram of antimony pentachloride in bis(2-chloroethyl) 2-chloroethylphosphonate (the 1:1 mole ratio product prepared in accordance with Example 25) were stirred together and then placed in a 2½" mold and heated at 150° C. for 10 minutes in a Carver lab press under a pressure of 5,000 p.s.i. After cooling to room a transparent, hard plaque was obtained which would not burn.

When the procedure was repeated employing the 1:2 mole ratio product of Example 25, the plaque obtained was self-extinguishing.

Example 29

To a nitrogen-purged Pyrex polymerization tube were charged 15 grams of styrene, 5 grams of antimony trichloride in diethyl vinylphosphonate (prepared in accordance with Example 14), and 0.8 gram of $\alpha,\alpha'$-azo-bis-isobutyronitrile. The tube was capped and rotated in a constant temperature bath maintained at a temperature of 50° C. for two days. The copolymer was then removed from the tube. This product was hard, clear and burned reluctantly when heated.

Example 30

To a nitrogen-purged Pyrex polymerization tube were charged 42 grams of ethyl acrylate, 24 grams of antimony trichloride in diethyl vinylphosphonate (prepared in accordance with Example 14), 60 milliliters of benzene, and 0.5 gram of $\alpha,\alpha'$-azo-bis-isobutyronitrile. The tube was capped and rotated in a constant temperature bath maintained at a temperature of 50° C. for two days. At the end of this time, the tube was opened and isopropyl ether was added to the contents thereof. The soft rubbery copolymer which precipitated was washed with isopropyl ether, collected by filtration, and dried in a vacuum desiccator. About 41 grams of product were recovered. The copolymer had a combined complex content of about 30 percent by weight, a reduced viscosity of 0.92 at 0.2 percent concentration in ethylene dichloride, and burned reluctantly when heated.

What is claimed is:

1. A coordination complex of a halide of a metal selected from the group consisting of antimony, tin and titanium, with a pentavalent phosphorus compound selected from the group consisting of compounds represented by the formulas:

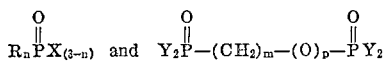

wherein R is a monovalent hydrocarbon radical having from 1 to 20 carbon atoms; X is a radical selected from the group consisting of —OR, and —NR$_2$, wherein R is as above defined; Y is a radical selected from the group consisting of —R and —OR, wherein R is as above defined; $n$ is an integer having a value of from 1 to 2; $m$ is an integer having a value of from 0 to 10, and is at least 1 when $p$ is 0; and $p$ is an integer having a value of from 0 to 1, and is 1 when $m$ is 0.

2. A coordination complex of a halide of a metal selected from the group consisting of antimony, tin and titanium, with a pentavalent phosphorus compound selected from the group consisting of compounds represented by the formulas:

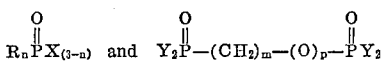

wherein R is a monovalent hydrocarbon radical having from 1 to 12 carbon atoms; X is a radical selected from the group consisting of —OR, and NR$_2$, wherein R is as above defined; Y is a radical selected from the group consisting of —R and —OR, wherein R is as above defined; $n$ is an integer having a value of from 1 to 2; $m$ is an integer having a value of from 0 to 4, and is at least 1 when $p$ is 0; and p is an integer having a value of from 0 to 1, and is 1 when $m$ is 0.

3. A coordination complex of a halide of a metal selected from the group consisting of antimony, tin and titanium, with a pentavalent phosphorus compound selected from the group consisting of compounds represented by the formulas:

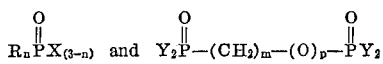

wherein R is a monovalent hydrocarbon radical having from 1 to 20 carbon atoms; X is a radical selected from the group consisting of —OR, and —NR$_2$, wherein R is as above defined; Y is a radical selected from the group consisting of —R and —OR, wherein R is as above defined; $n$ is an integer having a value of from 1 to 2; $m$ is an integer having a value of from 0 to 10, and is at least 1 when $p$ is 0; and $p$ is an integer having a value of from 0 to 1, and is 1 when $m$ is 0; said complex being prepared by admixing the metal halide and phosphorus compound in a ratio of from about 0.25 mole to about 10 moles of the metal halide per mole of the phosphorus compound.

4. A coordination complex of a halide of a metal selected from the group consisting of antimony, tin and titanium, with a pentavalent phosphorus compound selected from the group consisting of compounds represented by the formulas:

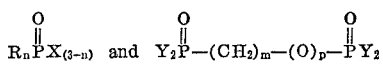

wherein R is a monovalent hydrocarbon radical having from 1 to 12 carbon atoms; X is a radical selected from the group consisting of —OR, and —NR$_2$, wherein R is as above defined; Y is a radical selected from the group consisting of —R and —OR, wherein R is as above defined; $n$ is an integer having a value of from 1 to 2; $m$ is an integer having a value of from 0 to 4, and is at least 1 when $p$ is 0; and $p$ is an integer having a value of from 0 to 1, and is 1 when $m$ is 0; said complex being prepared by admixing the metal halide and phosphorus compound in a ratio of from about 0.5 mole to about 3 moles of the metal halide per mole of the phosphorus compound.

5. A coordination complex of antimony trichloride with a pentavalent phosphorus compound selected from the group consisting of compounds represented by the formulas:

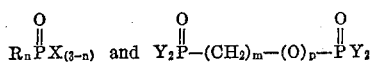

wherein R is a monovalent hydrocarbon radical having from 1 to 20 carbon atoms; X is —NR$_2$, wherein R is as above defined; Y is a radical selected from the group consisting of —R and —OR, wherein R is as above defined; $n$ is an integer having a value of from 1 to 2; $m$ is an integer having a value of from 0 to 10, and is at least 1 when $p$ is 0; and $p$ is an integer having a value of from 0 to 1, and is 1 when $m$ is 0; said complex being prepared by admixing the antimony trichloride and phosphorus compound in a ratio of from about 0.25 mole to about 10 moles of the antimony trichloride per mole of the phosphorus compound.

6. A coordination complex of antimony trichloride with a pentavalent phosphorus compound selected from the group consisting of compounds represented by the formulas:

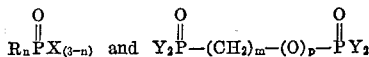

wherein R is a monovalent hydrocarbon radical having from 1 to 12 carbon atoms; X is —NR$_2$, wherein R is as above defined; Y is a radical selected from the group consisting of —R and —OR, wherein R is as above defined; $n$ is an integer having a value of from 1 to 2; $m$ is an integer having a value of from 0 to 4, and is at least 1 when $p$ is 0; and $p$ is an integer having a value of from 0 to 1, and is 1 when $m$ is 0; said complex being prepared by admixing the antimony trichloride and phosphorus compound in a ratio of from about 0.5 mole to about 3 moles of the antimony trichloride per mole of the phosphorus compound.

7. A coordination complex of antimony tribromide with a pentavalent phosphorus compound selected from the group consisting of compounds represented by the formulas:

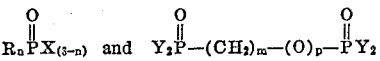

wherein R is a monovalent hydrocarbon radical having from 1 to 20 carbon atoms; X is —NR$_2$, wherein R is as above defined; Y is a radical selected from the group consisting of —R and —OR, wherein R is as above defined; $n$ is an integer having a value of from 1 to 2; $m$ is an integer having a value of from 0 to 10, and is at least 1 when $p$ is 0; and $p$ is an integer having a value of from 0 to 1, and is 1 when $m$ is 0; said complex being prepared by admixing the antimony tribromide and phosphorus compound in a ratio of from about 0.25 mole to about 10 moles of the antimony tribromide per mole of the phosphorus compound.

8. A coordination complex of antimony tribromide with a pentavalent phosphorus compound selected from the group consisting of compounds represented by the formulas:

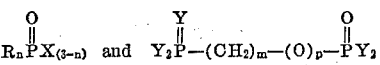

wherein R is a monovalent hydrocarbon radical having from 1 to 12 carbon atoms; X is —NR$_2$, wherein R is as above defined; Y is a radical selected from the group consisting of —R and —OR, wherein R is as above defined; $n$ is an integer having a value of from 0 to 2; $m$ is an integer having a value of from 0 to 4, and is at least 1 when $p$ is 0; and $p$ is an integer having a value of from 0 to 1, and is 1 when $m$ is 0; said complex being prepared by admixing the antimony tribromide and phosphorus compound in a ratio of from about 0.5 mole to about 3 moles of the antimony tribromide per mole of the phosphorus compound.

9. A coordination complex of stannic chloride with a pentavalent phosphorus compound selected from the group consisting of compounds represented by the formulas:

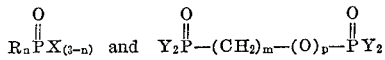

wherein R is a monovalent hydrocarbon radical having from 1 to 20 carbon atoms; X is a radical selected from the group consisting of —OR, and —NR$_2$, wherein R is as above defined; Y is a radical selected from the group consisting of —R and —OR, wherein R is as above defined; $n$ is an integer having a value of from 1 to 2; $m$ is an integer having a value of from 0 to 10, and is at least 1 when $p$ is 0; and $p$ is an integer having a value of from 0 to 1, and is 1 when $m$ is 0; said complex being prepared by admixing the stannic chloride and phosphorus compound in a ratio of from about 0.25 mole to about 10 moles of the stannic chloride per mole of the phosphorus compound.

10. A coordination complex of stannic chloride with a pentavalent phosphorus compound selected from the group consisting of compounds represented by the formulas:

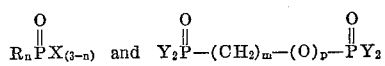

wherein R is a monovalent hydrocarbon radical having from 1 to 12 carbon atoms; X is a radical selected from the group consisting of —OR, and —NR$_2$, wherein R is as above defined; Y is a radical selected from the group consisting of —R and —OR, wherein R is as above defined; $n$ is an integer having a value of from 1 to 2; $m$ is an integer having a value of from 0 to 4, and is at least 1 when $p$ is 0; and $p$ is an integer having a value of from 0 to 1, and is 1 when $m$ is 0; said complex being prepared by admixing the stannic chloride and phosphorus compound in a ratio of from about 0.5 mole to about 3 moles of the stannic chloride per mole of the phosphorus compound.

11. A coordination complex of titanium tetrachloride with a pentavalent prosphorus compound selected from the group consisting of compounds represented by the formulas:

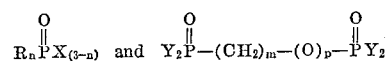

wherein R is a monovalent hydrocarbon radical having from 1 to 20 carbon atoms; X is a radical selected from the group consisting of —OR, and —NR$_2$, wherein R is as above defined; Y is a radical selected from the group consisting of —R and —OR, wherein R is as above defined; $n$ is an integer having a value of from 1 to 2; $m$ is an integer having a value of from 0 to 10, and is at least 1 when $p$ is 0; and $p$ is an integer having a value of from 0 to 1, and is 1 when $m$ is 0; said complex being prepared by admixing the titanium tetrachloride and phosphorus compound in a ratio of from about 0.25 mole to about 10 moles of the titanium tetrachloride per mole of the phosphorus compound.

12. A coordination complex of titanium tetrachloride with a pentavalent phosphorus compound selected from the group consisting of compounds represented by the formulas:

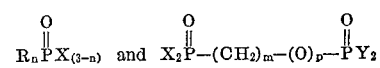

wherein R is a monovalent hydrocarbon radical having from 1 to 12 carbon atoms; X is a radical selected from the group consisting of —OR, and —NR$_2$, wherein R is as above defined; Y is a radical selected from the group consisting of —R and —OR, wherein R is as above defined; $n$ is an integer having a value of from 1 to 2; $m$ is an integer having a value of from 0 to 4, and is at least 1 when $p$ is 0; and $p$ is an integer having a value of from 0 to 1, and is 1 when $m$ is 0; said complex being prepared by admixing the titanium tetrachloride and phosphorus compound in a ratio of from about 0.5 mole to about 3 moles of the titanium tetrachloride per mole of the phosphorus compound.

13. A coordination complex of antimony triiodide with a pentavalent phosphorus compound selected from the group consisting of compounds represented by the formulas:

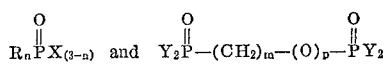

wherein R is a monovalent hydrocarbon radical having from 1 to 20 carbon atoms; X is —NR$_2$, wherein R is as above defined; Y is a radical selected from the group consisting of —R and —OR, wherein R is as above defined; $n$ is an integer having a value of from 1 to 2; $m$ is an integer having a value of from 0 to 10, and is at least 1 when $p$ is 0; and $p$ is an integer having a value of from 0 to 1, and is 1 when $m$ is 0; said complex being prepared by admixing the antimony triiodide and phosphorus compound in a ratio of from about 0.25 mole to about 10 moles of the antimony triiodide per mole of the phosphorus compound.

14. A coordination complex of antimony triiodide with a pentavalent phosphorus compound selected from the group consisting of compounds represented by the formulas:

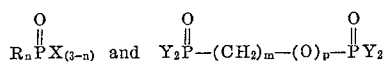

wherein R is a monovalent hydrocarbon radical having from 1 to 12 carbon atoms; X is —NR$_2$, wherein R is as, above defined; Y is a radical selected from the group consisting of —R and —OR, wherein R is as above defined; $n$ is an integer having a value of from 1 to 2; $m$ is an integer having a value of from 0 to 4, and is at least 1 when $p$ is 0; and $p$ is an integer having a value of from 0 to 1, and is 1 when $m$ is 0; said complex being prepared by admixing the antimony triiodide and phosphorus compound in a ratio of from about 0.5 mole to about 3 moles of the antimony triiodide per mole of the phosphorus compound.

15. A coordination complex of antimony pentachloride with a pentavalent phosphorus compound selected from the group consisting of compounds represented by the formulas:

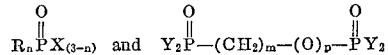

wherein R is a monovalent hydrocarbon radical having from 1 to 20 carbon atoms; X is —NR$_2$, wherein R is as above defined; Y is a radical selection from the group consisting of —R and —OR, wherein R is as above defined; $n$ is an integer having a value of 1 to 2; $m$ is an integer having a value of from 0 to 4, and is at least 1 when $p$ is 0; and $p$ is an integer having a value of from 0 to 1, and is 1 when $m$ is 0; said complex being prepared by admixing the antimony pentachloride and phosphorus compound in a ratio of from about 0.25 mole to about 10 moles of the antimony pentachloride per mole of the phosphorus compound.

16. A coordination complex of antimony pentachloride with a pentavalent phosphorus compound selected from the group consisting of compounds represented by the formulas:

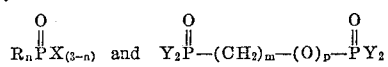

wherein R is a monovalent hydrocarbon radical having from 1 to 12 carbon atoms; X is —NR$_2$, wherein R is as above defined; Y is a radical selected from the group consisting of —R and —OR, wherein R is as above defined; $n$ is an integer having a value of from 1 to 2; $m$ is an integer having a value of from 0 to 4, and is at least 1 when $p$ is 0; and $p$ is an integer having a value of from 0 to 1, and is 1 when $m$ is 0; said complex being prepared by admixing the antimony pentachloride and phosphorus compound in a ratio of from about 0.5 mole to about 3 moles of the antimony pentachloride per mole of the phosphorus compound.

17. A coordination complex of antimony trichloride with tris(2,3-dibromopropyl) phosphate, said complex being prepared by admixing the antimony trichloride and tris(2,3-dibromopropyl) phosphate in a ratio of from about 0.5 mole to about 3 moles of the antimony trichloride per mole of the tris(2,3-dibromopropyl) phosphate.

18. A coordination complex of antimony trichloride with tris(2-chloroethyl) phosphate, said complex being prepared by admixing the antimony trichloride and tris-(2-chloroethyl) phosphate in a ratio of from about 0.5 mole to about 3 moles of the antimony trichloride per mole of the tris(2-chloroethyl) phosphate.

19. A coordination complex of antimony trichloride with tris(2,3-dichloropropyl) phosphate, said complex being prepared by admixing the antimony trichloride and tris(2,3-dichloropropyl) phosphate present in a ratio of from about 0.5 mole to about 3 moles of the antimony trichloride per mole of the tris(2,3-dichloropropyl) phosphate.

20. A coordination complex of antimony trichloride with triallyl phosphate, said complex being prepared by admixing the antimony trichloride and triallyl phosphate in a ratio of from about 0.5 mole to about 3 moles of the antimony trichloride per mole of the triallyl phosphate.

21. A coordination complex of antimony trichloride with bis(2-chloroethyl) 2-chloroethylphosphonate, said complex being prepared by admixing the antimony trichloride and bis(2-chloroethyl) 2-chloroethylphosphonate in a ratio of from about 0.5 mole to about 3 moles of the antimony trichloride per mole of the bis(2-chloroethyl) 2-chloroethylphosphonate.

22. A coordination complex of antimony trichloride with diethyl vinylphosphonate, said complex being prepared by admixing the antimony trichloride and diethyl vinylphosphonate in a ratio of from about 0.5 mole to about 3 moles of the antimony trichloride per mole of the diethyl vinylphosphonate.

23. A coordination complex of antimony trichloride with tetraethyl ethylenediphosphonate, said complex being prepared by admixing the antimony trichloride and tetraethyl ethylenediphosphonate in a ratio of from about 0.5 mole to about 3 moles of the antimony trichloride per mole of the tetraethyl ethylenediphosphonate.

24. A coordination complex of antimony trichloride with ethyl diphenylphosphinate, said complex being prepared by admixing the antimony trichloride and ethyl diphenylphosphinate in a ratio of from about 0.5 mole to about 3 moles of the antimony trichloride per mole of the ethyl diphenylphosphinate.

25. A coordination complex of antimony trichloride with hexamethylphosphoramide, said complex being prepared by admixing the antimony trichloride and hexamethylphosphoramide in a ratio of from about 0.5 mole to about 3 moles of the antimony trichloride per mole of the hexamethylphosphoramide.

26. A coordination complex of stannic chloride with tris(2-chloroethyl) phosphate, said complex being prepared by admixing the stannic chloride and tris(2-chloroethyl) phosphate in a ratio of from about 0.5 mole to about 3 moles of the stannic chloride per mole of the tris(2-chloroethyl) phosphate.

27. A coordination complex of titanium tetrachloride with bis(2-chloroethyl) 2-chloroethylphosphonate, said complex being prepared by admixing the titanium tetrachloride and bis(2-chloroethyl) 2-chloroethylphosphonate in a ratio of from about 0.5 mole to about 3 moles of the titanium tetrachloride per mole of the bis(2-chloroethyl) 2-chloroethylphosphonate.

28. A coordination complex of antimony pentachloride with bis(2-chloroethyl) 2-chloroethylphosphonate, said complex being prepared by admixing the antimony pentachloride and bis(2-chloroethyl) 2-chloroethylphosphonate in a ratio of from about 0.5 mole to about 3.0 moles of the antimony pentachloride per mole of the bis(2-chloroethyl) 2-chloroethylphosphonate.

References Cited

UNITED STATES PATENTS

| | | | |
|---|---|---|---|
| 2,649,439 | 8/1953 | Brown | 260—89.5 |
| 2,758,106 | 8/1956 | Bredereck et al. | 260—89.5 |
| 2,850,512 | 9/1958 | Beacham et al. | 260—429.5 |
| 2,926,183 | 2/1960 | Russell | 260—429.5 |
| 2,958,674 | 11/1960 | Arnold | 260—89.5 X |

OTHER REFERENCES

Lindqvist et al.: "Acta Chemica Scandinavica," 13 (1959), pp. 1753–1757.

"Naturwissenschaften" (1960), 47, No. 2, pp. 39–40.

Frazer et al.: "J. Inorg. Nucl. Chem.," June 1963, volume 25, pp. 637–640.

"Chemical Abstracts," vol. 47, p. 3167a, April-June 1953.

"Chemical Abstracts," vol. 47, p. 4234i, April-June 1953.

"Chemical Abstracts," vol. 58, p. 969g, January 1963.

Gutmann: "Osterreichische Chemikerzeitung," vol. 62 (1961), pp. 326, 329 to 332.

"Chemical Abstracts," vol. 47, p. 4777f (1953).

"Chemical Abstracts," vol. 53, p. 3880g (1959).

"Chemical Abstracts," vol. 56, p. 68696 (1962).

TOBIAS E. LEVOW, *Primary Examiner.*

H. M. S. SNEED, *Assistant Examiner.*